(12) United States Patent  (10) Patent No.: US 8,998,142 B2
Loupias  (45) Date of Patent: Apr. 7, 2015

(54) DEVICE FOR LINKING A STRINGER AND A FRAME OF AN AIRCRAFT STRUCTURE

(75) Inventor: Thierry Loupias, Blagnac (FR)

(73) Assignee: Airbus Operations (SAS), Toulouse (FR)

( * ) Notice: Subject to any disclaimer, the term of this patent is extended or adjusted under 35 U.S.C. 154(b) by 263 days.

(21) Appl. No.: 13/600,634

(22) Filed: Aug. 31, 2012

(65) Prior Publication Data

US 2013/0062470 A1 Mar. 14, 2013

(30) Foreign Application Priority Data

Sep. 13, 2011 (FR) ...................................... 11 58138

(51) Int. Cl.
*B64C 1/06* (2006.01)
(52) U.S. Cl.
CPC .. *B64C 1/06* (2013.01); *B64C 1/061* (2013.01)
(58) Field of Classification Search
USPC ...................................... 244/131, 119, 117 R
See application file for complete search history.

(56) References Cited

U.S. PATENT DOCUMENTS

| | | | | |
|---|---|---|---|---|
| 1,394,464 | A | * | 10/1921 | Bentley .......................... 403/161 |
| 1,835,339 | A | * | 12/1931 | Rossman ....................... 403/188 |
| 5,924,650 | A | * | 7/1999 | Richichi ........................ 244/131 |
| 6,270,039 | B1 | * | 8/2001 | Linjama ........................ 244/213 |
| 7,059,565 | B2 | * | 6/2006 | Scown et al. ............. 244/117 R |
| 8,245,977 | B2 | * | 8/2012 | Binder ............................ 244/131 |
| 8,366,043 | B2 | * | 2/2013 | Stephan ........................ 244/119 |
| 8,444,089 | B2 | * | 5/2013 | Mischereit et al. ........... 244/119 |
| 8,453,975 | B2 | * | 6/2013 | Dietrich et al. ............... 244/132 |
| 2011/0001010 | A1 | | 1/2011 | Tacke et al. |

FOREIGN PATENT DOCUMENTS

FR 2952905 5/2011
GB 631918 11/1949

OTHER PUBLICATIONS

Search report from priority application FR 1158138.

* cited by examiner

*Primary Examiner* — Brian M O'Hara
*Assistant Examiner* — Keith L Dixon
(74) *Attorney, Agent, or Firm* — Greer Burns & Crain, Ltd.

(57) ABSTRACT

A device for linking a frame and a stringer of an aircraft structure, including a first portion connected to a support surface of a frame, a second portion connected to a support surface of a stringer and a third portion referred to as intermediary portion connecting the first portion to the second portion. The second portion is connected to the intermediary portion by means of an articulation allowing for a relative movement between the two portions along a rotation axis perpendicular to the support surface of the stringer. The first portion is connected to the intermediary portion by means of an articulation allowing for a relative movement between the two portions along a rotation axis parallel to the support surface of the frame and to the support surface of the stringer.

7 Claims, 2 Drawing Sheets

DEVICE FOR LINKING A STRINGER AND A FRAME OF AN AIRCRAFT STRUCTURE

BACKGROUND OF THE INVENTION

The present invention relates to a device for linking a stringer and a frame of an aircraft structure, more particularly adapted to ensure the linking between a stringer and a frame located in the area of the structure of a front or rear section of an aircraft.

FIG. 1 schematically shows a known structure of a front section of an aircraft. It comprises frames 10 arranged in transverse planes (perpendicular to the longitudinal direction) and stringers 12 arranged in the planes along the longitudinal direction.

As shown in FIG. 2, in the area of each known intersection of a frame 10 with a stringer 12, a linking device 14 also referred to as stabilizer is provided to ensure the linking between these two elements. The stabilizers allow for the structure to be rigidified by limiting the rotational movements between the two elements along a first tangential rotation axis contained in a transverse plane and along a second tangential rotation axis contained in the longitudinal plane.

A linking device 14 comprises an angle plate with two wings 16 and 18 connected by an edge 20, a first wing 16 being flattened against and connected to the frame 10 and a second wing 18 being flattened against and connected to the stringer 12.

This device is characterized by two angles, angle A1 between the wing 16 taking support against the frame 10 and the upper surface 22 of the stringer 12, and angle A2 in a plane perpendicular to the edge 20 between the two wings 16 and 18.

In the area of the central portion of the structure, the cross-section of the plane is substantially constant, which means that the stringers are substantially rectilinear. In this case, the linking devices are all quasi-identical.

In the area of the front tip or rear tip of the aircraft, the frames do not have the same dimensions, which means that the stringers are no longer rectilinear, but rather curved.

Thus, the angle (corresponding to angle A1) formed between the upper surface of a stringer and the support surface of a frame varies from one frame to another. In addition, since the frames are not circular, the stringers do not all have the same radius of curvature, which means that said angle varies from one stringer to another for the same frame.

This is also the case for the angle (corresponding to angle A2) formed by the support surfaces of the frame and stringer.

Consequently, in the same area of the structure, because of the variations of the aforementioned angles and of the support surface of the stringer, it is necessary to provide stabilizers 14, 14' 14" having different dimensions and geometry, as shown in FIG. 2. The great number of different models of stabilizers is an issue in terms of inventory management and during the assembly, the operator having, each time, to choose among several models of stabilizers which one is best suited for the implantation area.

SUMMARY OF THE INVENTION

The present invention aims at overcoming the drawbacks of the prior art by providing for an enhanced linking device suitable to be adapted to different implantation areas.

To this end, the object of the invention is a device for linking a frame and a stringer of an aircraft structure, comprising a first portion connected to a support surface of a frame, a second portion connected to a support surface of a stringer, and a third portion, referred to as an intermediary portion, connecting the first portion to the second portion, characterized in that the second portion is connected to the intermediary portion by means of an articulation allowing for a relative movement between said two portions according to a rotation axis, perpendicular to the support surface of the stringer and the first portion is connected to the intermediary portion by means of an articulation allowing for a relative movement between said two portions according to a rotation axis parallel to the support surface of a frame and to the support surface of the stringer.

BRIEF DESCRIPTION OF THE DRAWINGS

Other characteristics and advantages will become apparent from the description that follows, given only by way of non-limiting example, with reference to the annexed drawings, wherein.

DETAILED DESCRIPTION OF THE PREFERRED EMBODIMENTS

Figure 1:
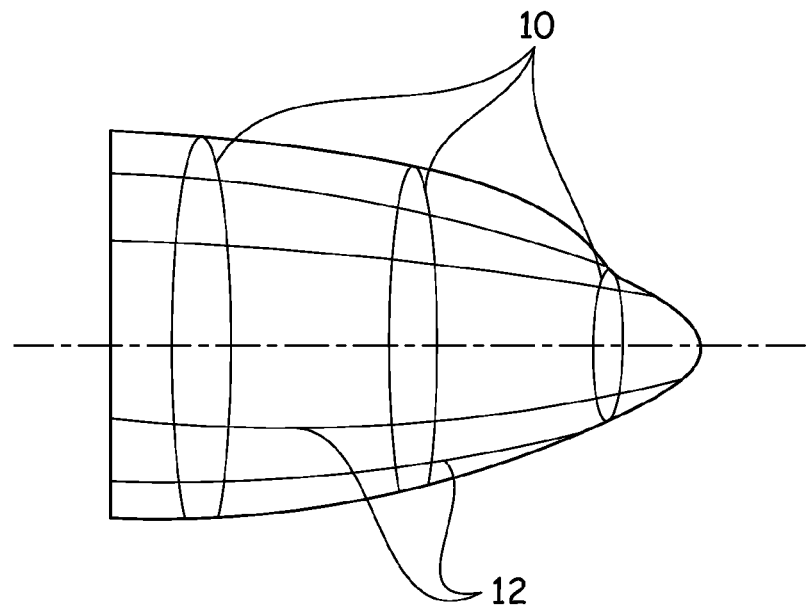
FIG. 1 is a schematic view of a front cross-section structure of a prior art aircraft.
Figure 2:
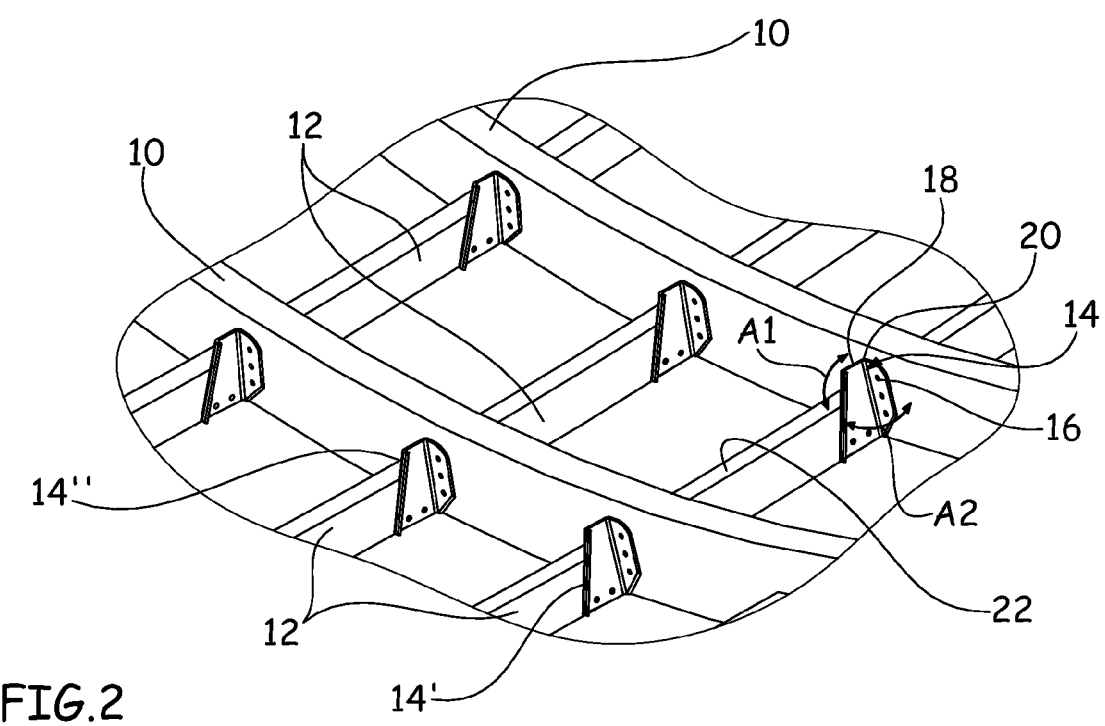
FIG. 2 is a perspective view of various linking devices according to prior art.
Figure 3:
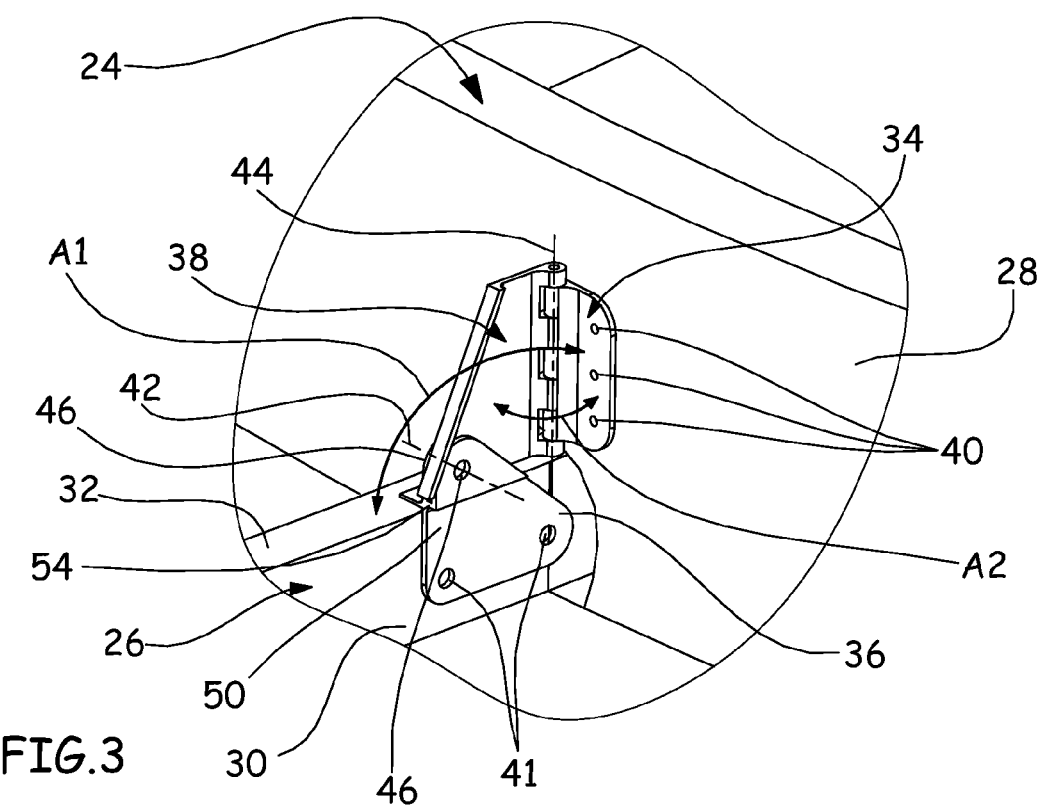
FIG. 3 is a perspective view according to a first orientation of a device for linking a stringer and a frame according to the invention.
Figure 4:
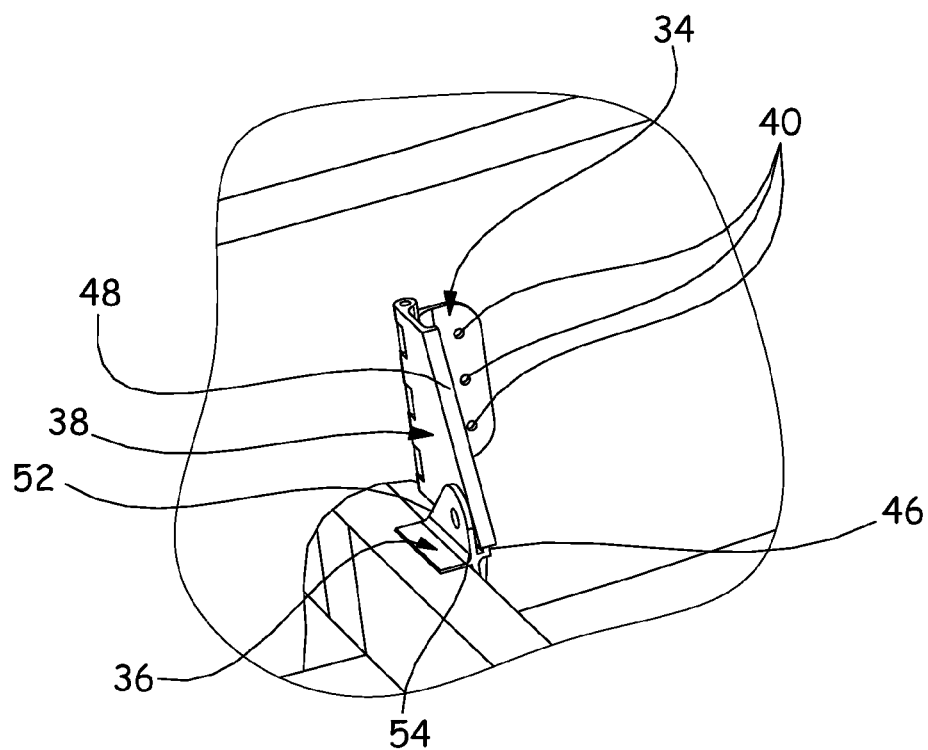
FIG. 4 is a perspective view according to another orientation of a device for linking a stringer and a frame according to the invention.

A frame 24 and a stringer 26, which crosses through the frame via a notch, are shown in FIGS. 3 and 4.

For the remainder of the description, the longitudinal axis corresponds to the axis extending from the front tip to the rear tip of the aircraft.

A longitudinal plane contains the longitudinal axis.

A radial direction is perpendicular to the longitudinal axis and a transverse plane is also perpendicular to the longitudinal axis.

The frames are arranged in transverse planes and the stringers along longitudinal planes.

In the area of each intersection, a frame 24 and a stringer 26 are connected by a linking device.

The frame 24 comprises a support surface 28 for the linking device. In addition, the stringer 24 comprises a support surface 30 for the linking device and an upper surface 32 substantially perpendicular to the support surface 30.

The linking device comprises a first portion 34 connected to the support surface 28 of the frame and a second portion 36 connected to the support surface 30 of the stringer and a third portion 38 referred to as intermediary portion connecting the first portion 34 to the second portion 36.

The first portion 34 forms an angle A1 with the upper surface of the stringer.

The first portion 34 forms an angle A2 with the other portions 36 and 38.

According to an embodiment, the first portion 34 of the linking device is connected to the support surface 28 of the frame 24 by three fastening means 40, particularly rivets, aligned along a longitudinal plane. However, the mode of assembly of the linking device with the frame 24 is not limited to this embodiment and other solutions could be envisioned.

In parallel, according to an embodiment, the second portion 36 of the linking device is connected to the stringer by two fastening means 41, particularly rivets, aligned along a direction parallel to the upper surface 32. However, the mode of assembly of the linking device with the stringer is not limited to this embodiment and other solutions could be envisioned.

According to the invention, the second portion 36 is connected to the intermediary portion 38 by means of an articulation allowing for a relative movement between the two portions 36 and 38 along a rotation axis 42 perpendicular to the support surface 30 of the stringer.

In addition, the first portion 34 is connected to the intermediary portion 38 by means of an articulation allowing for a relative movement between the two portions 34 and 38 along a rotation axis 44 parallel to the support surface 28 of the frame and to the support surface 30 of the stringer.

According to a first alternative, the linking device comprises two articulations, a first articulation along the rotation axis 42 and a second articulation along the rotation axis 44. This solution allows the two angles A1 and A2 to be adjusted. According to an embodiment, the articulation between the first portion 34 and the intermediary portion 38 is carried out by a hinge having the rotation axis 44 as a pivot axis.

According to an embodiment, the second portion 36 comprises two parallel flanges 46 between which a part of the intermediary portion 38 is arranged. The flanges 46 and the part of the intermediary portion comprise openings that are aligned and suitable for housing a rod whose diameter is adjusted to that of the openings providing the function of rotation axis 42. The rod can correspond to the cylindrical body of a rivet, for example.

However, other solutions could be envisioned to make the axes of rotation 42 and 44.

According to an embodiment, the first portion 34 is in the form of a substantially rectangular plate with, in the area of a long side, tubes that are aligned and form a hinge portion.

According to an embodiment, the intermediary portion 38 is in the form of a plate having a trapezoidal rectangular shape, a first side perpendicular to the large base comprising tubes that are aligned and form a portion of the hinge. The part of the intermediary portion 38 near the large base is interposed between the flanges 46 of the second portion 36. Advantageously, the other side, interposed between the large base and the small base, comprises a bend so as to form a wing 48 perpendicularly to the remainder of the intermediary portion 38 suitable to reinforce it.

According to a preferred embodiment, the second portion 36 has a fork-shape cross-section in a transverse plane and a triangular shape with two rounded apexes in a longitudinal plane. Thus, it comprises a lower portion 50 in the form of a plate flattened against the stringer, an upper portion 52 with a U-shape cross-section forming the two flanges 46 parallel to the lower portion 50 and an intermediary portion 54 in the form of a plate perpendicular to the lower portion 50 adapted to take support against the upper surface 32 of a stringer in order to facilitate the positioning of the linking device 26.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for linking a stringer and a frame of an aircraft structure, comprising:
    a first portion configured to be connected to a frame of an aircraft structure,
    a second portion configured to be connected to a stringer of the aircraft structure, and
    a third portion connected to the first portion and connected to the second portion,
    wherein the first portion and the third portion are movable relative to each other about a first rotation axis when the first portion is connected to the frame, and
    wherein the second portion and the third portion are movable relative to each other about a second rotation axis being perpendicular to the first rotation axis when the second portion is connected to the stringer.

2. The device of claim 1 wherein the first portion and the third portion form a hinge having a pivot axis which comprises the first rotation axis.

3. The device of claim 1 wherein the second portion comprises a lower portion being a plate and an upper portion with a u-shaped cross section forming two flanges each including an opening.

4. The device of claim 3 wherein a portion of the third portion includes an opening, and wherein the device further comprises:
    a rod passing through the openings of the flanges and through the opening of the portion of the third portion, and
    wherein the rod comprises the second rotation axis and connects the second portion to the third portion.

5. The device of claim 1 wherein the third portion comprises a trapezoidal rectangular plate having a first side with at least one tube and a lower portion with an opening.

6. The device of claim 5 wherein a second side of the trapezoidal rectangular forms a wing, the second side opposite the first side of the trapezoidal rectangular.

7. The device of claim 1 wherein the first portion comprises a substantially rectangular plate with a side having at least one tube.

* * * * *